April 1, 1941.　　　A. N. GOLDSMITH　　　2,236,502
COMPOSITE-DELINEATION TELEVISION
Filed May 19, 1938　　　5 Sheets-Sheet 1
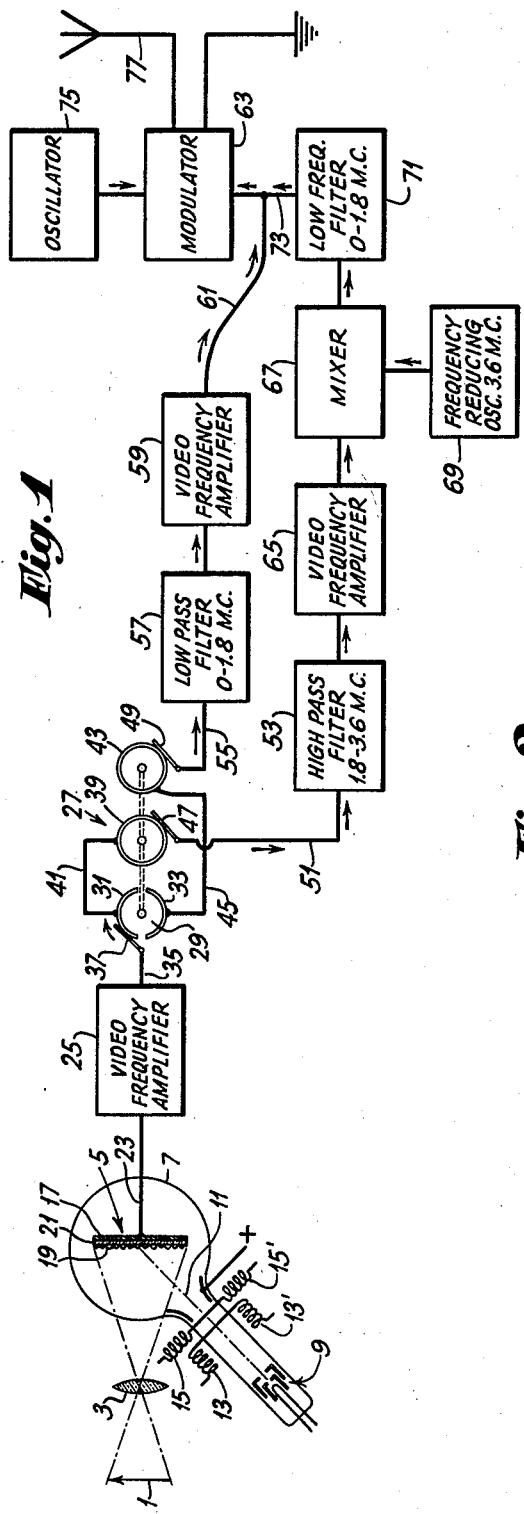
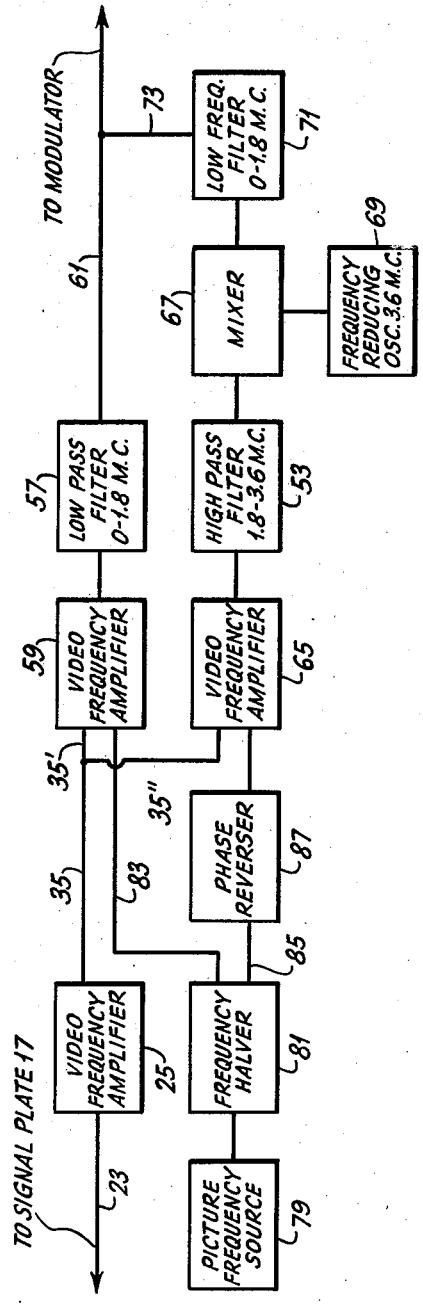
INVENTOR.
ALFRED N. GOLDSMITH
BY
ATTORNEY.

April 1, 1941.   A. N. GOLDSMITH   2,236,502
COMPOSITE-DELINEATION TELEVISION
Filed May 19, 1938   5 Sheets-Sheet 2
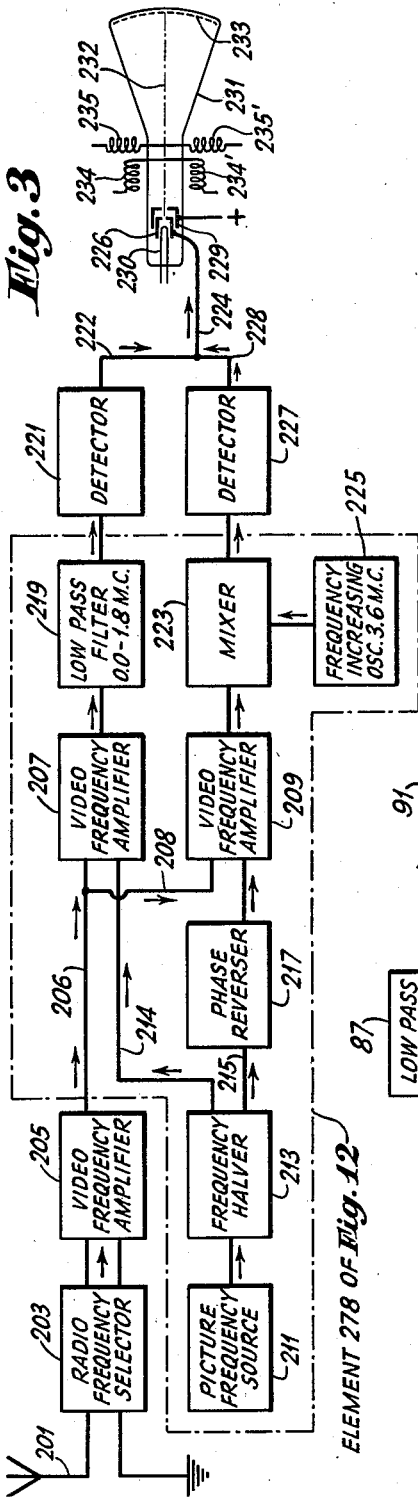
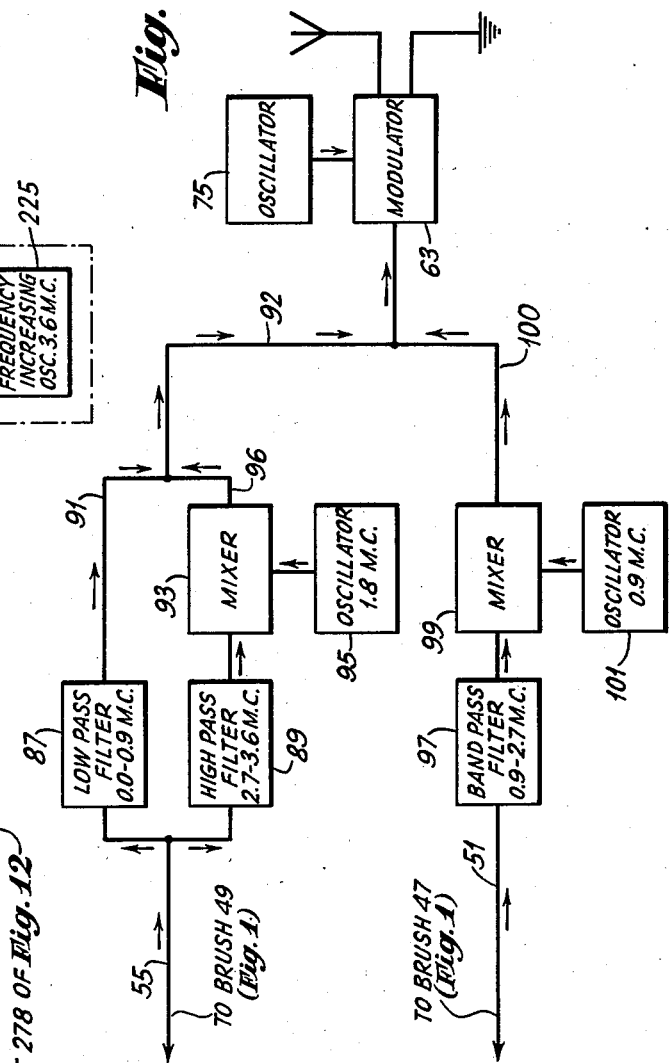
INVENTOR.
ALFRED N. GOLDSMITH
BY
ATTORNEY.

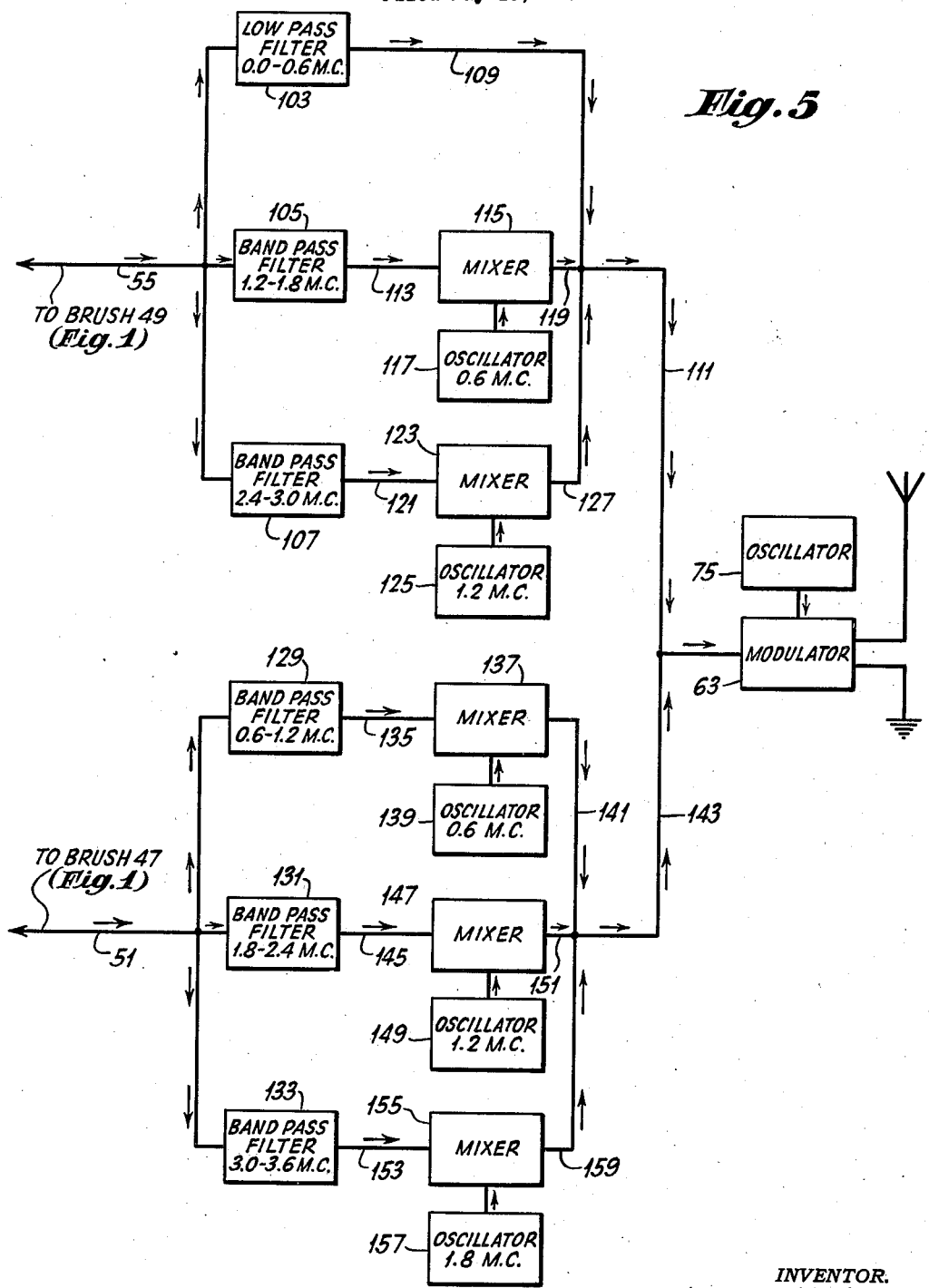

April 1, 1941.  A. N. GOLDSMITH  2,236,502
COMPOSITE-DELINEATION TELEVISION
Filed May 19, 1938   5 Sheets-Sheet 4

*Fig. 6a*
ODD PICTURE FIELDS
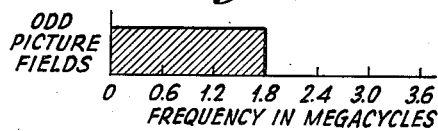
FREQUENCY IN MEGACYCLES

*Fig. 6b*
EVEN PICTURE FIELDS
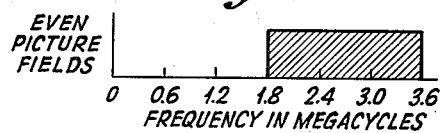
FREQUENCY IN MEGACYCLES

*Fig. 7a*
ODD PICTURE FIELDS
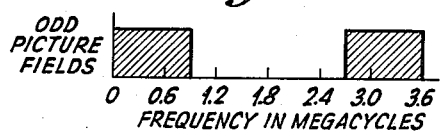
FREQUENCY IN MEGACYCLES

*Fig. 7b*
EVEN PICTURE FIELDS
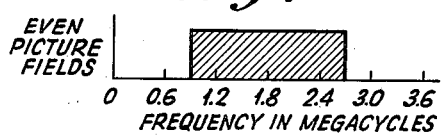
FREQUENCY IN MEGACYCLES

*Fig. 8a*
ODD PICTURE FIELDS
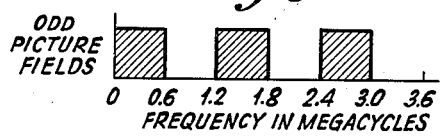
FREQUENCY IN MEGACYCLES

*Fig. 8b*
EVEN PICTURE FIELDS
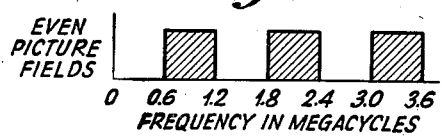
FREQUENCY IN MEGACYCLES

*Fig. 9a*
FIELD NO. 1, 3 ETC.
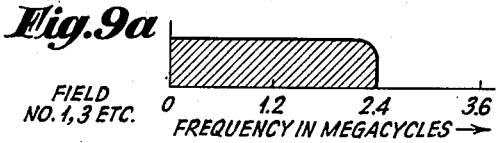
FREQUENCY IN MEGACYCLES →

*Fig. 9b*  ← FREQUENCY REDUCTION
FIELD NO. 2, 4 ETC.
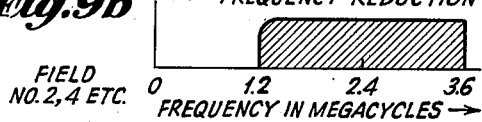
FREQUENCY IN MEGACYCLES →

*Fig. 10a*
FIELD NO. 1, 3 ETC.
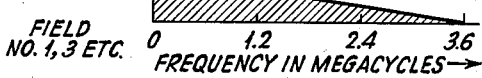
FREQUENCY IN MEGACYCLES →

*Fig. 10b*
FIELD NO. 2, 4 ETC.
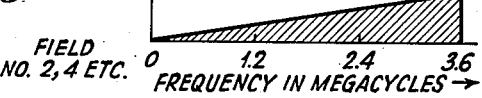
FREQUENCY IN MEGACYCLES →

*Fig. 10c*
FIELD NO. 2, 4 ETC. IN OUTPUT OF MIXER
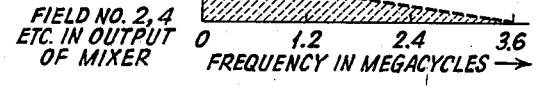
FREQUENCY IN MEGACYCLES →

*Fig. 11a*
FIELD NO. 1, 3 ETC.
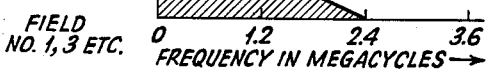
FREQUENCY IN MEGACYCLES →

*Fig. 11b*
FIELD NO. 2, 4 ETC.
FREQUENCY IN MEGACYCLES →

*Fig. 11c*
FIELD NO. 2, 4 ETC. IN OUTPUT OF MIXER
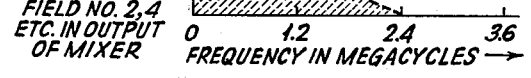
FREQUENCY IN MEGACYCLES →

INVENTOR.
ALFRED N. GOLDSMITH
BY H. S. Grover
ATTORNEY.

April 1, 1941.　　　A. N. GOLDSMITH　　　2,236,502
COMPOSITE-DELINEATION TELEVISION

Filed May 19, 1938　　　5 Sheets-Sheet 5

*Fig. 12*

INVENTOR.
ALFRED N. GOLDSMITH
BY
H. S. Grover
ATTORNEY.

Patented Apr. 1, 1941

2,236,502

UNITED STATES PATENT OFFICE 2,236,502

COMPOSITE-DELINEATION TELEVISION

Alfred N. Goldsmith, New York, N. Y.

Application May 19, 1938, Serial No. 208,810

17 Claims. (Cl. 178—6.8)

This invention relates to a television system and method for reducing or eliminating flicker in the received electro-optical pictures while retaining high definition therein as well as simplicity and reliability of operation of the transmitter and receiver equipment.

The present system, as it is proposed herein, will be described entirely as an illustrative example and for this purpose a television picture of 300 lines with an aspect ratio of 4-to-3 (the ratio of picture width to height) will be referred to as illustrative both in the specification and drawings. This reference to a specific type of picture is herein made solely to indicate the principles of the invention by referring to a numerically convenient example but it is to be understood that by such reference there is intended to be no limitations as to the line definition, the aspect ratio, frame reproduction rate or any other factors. Therefore, the illustrated example is to be considered purely as a general illustration of one form of system to which the invention is applicable.

In accordance with the usual television system, (assuming that the typical picture to be transmitted and received is one having 300 lines with an aspect ratio of 4-to-3) it will be seen that each picture as it is transmitted and received will be composed of 120,000 picture elements. If now it is assumed that a total of 30 completely delineated pictures of this sort are transmitted per second by whatever transmission method is selected, there will be transmitted each second 3,600,000 picture elements. According to some systems and methods of calculating the transmission side-bands required for such a picture numerical correction factors derived from experience and described in certain published papers are referred to but, for convenience herein, it will be assumed (as is frequently done) that the sideband required for transmission is equal to one-half the number of picture elements transmitted per second. Therefore, the assumed picture transmission side-band required for transmitting the assumed picture will be equal approximately to 1.8 megacycles (hereinafter megacycles will be referred to in its abbreviated form "m. c.").

Up to the present time two general methods or systems for transmitting such pictures have been proposed. One of these proposed systems has become known as the conventional "sequential line" transmission and the other of these systems has become known as the "interlaced-line" transmission.

In the first of these methods (i. e. the sequential line) the complete 300 line picture is transmitted during each series of scanning paths in one direction and the transmission is repeated at a predetermined rate, say 30 times per second. Such type of transmission would, of course, require the above assumed frequency band of 1.8 m. c. for transmission purposes. This method, in general, would be satisfactory for reproducing electro-optical images except for the fact that "flicker" appears in the received pictures. In viewing the received pictures so transmitted, where the reproduced electro-optical image is of a desirable size and brightness to be viewed at a convenient viewing distance the "flicker" effect is highly objectionable and usually causes considerable eye strain for the observer.

Accordingly, as a general proposition, this method of transmission for frame frequencies of the order of 30 per second has, by common consent among the experts in the field, been substantially discarded from a standpoint of commercialization considerations at the present date. The result is that, as a general proposition, the second method of transmission above referred to as "interlaced-line" transmission has been adopted both in the United States and in Europe at least experimentally. For this latter form of transmission, there will be transmitted each second 60 half-pictures where the frequency of the power line is 60 cycles or 50 half pictures per second where the power line frequency is 50 cycles.

These so-called half-pictures, or picture "fields," as usually termed, have only alternate lines of the complete picture therein. Thus, the first picture transmitted may include all of the odd lines, say lines 1, 3, 5, etc., while the second picture may include all of the even lines, say 2, 4, 6, etc. The process of transmitting alternate picture fields is continued throughout the transmission so that there are produced and transmitted 60 half-pictures or fields per second with the resultant delineated effect at the receiver being approximately equivalent to that of 30 whole pictures transmitted per second. This second method provides a greatly reduced flicker or even substantially a complete elimination of flicker which is not had by the first above described method but otherwise it is approximately equivalent to the first method above described.

Of course, it is understood herein that with the 300-line picture assumed the second method herein described of transmission used in the art would provide what is known as "even-line" interlacing, whereas most of the systems now in use experimentally scan an odd number of lines per picture or frame. Consequently the half-pictures or picture fields are composed of an integral number of complete lines of scanning plus a fractional part of the line. If now there are two picture fields to be interlaced to produce one complete picture or picture frame it is apparent that the fractional part added to the total number of lines in each picture field becomes equal to one-half.

In the method of interlaced-line transmission last described, the detail along the lines is unchanged from that which is provided by sequential scanning with a result that each of the separate picture fields scanned has full detail in a horizontal direction but, in view of the fact that alternate fields include only one-half of the total number of lines in the vertical direction each field is half detail in a vertical direction, so to speak. Accordingly, with the 300-line picture each half-picture or picture field will have only 150 lines and, therefore, the equivalent of 60,000 picture elements but, in view of the fact that 60 complete picture fields are transmitted each second, it will be seen that the side-band required for transmission is the same as for the conventional sequential line transmission. The successful operation of the interlaced line scanning method just described depends to a large extent upon accurate line interlacing and this requires accurately maintained timing and deflecting circuits and frequently imposes some difficulties in circuit design and power supply. However, the method last described has found favor because it performs the necessary result when accurately functioning for reducing flicker to the desired extent. A substantial amount of information relating to interlaced scanning exists and, while reference to all such published literature is made, one such publication is found in the Proceedings of the Institute of Radio Engineers, vol. 24 for April 1936 where commencing on page 559 Messrs. Kell, Bedford and Trainer describe such a system in a paper entitled "Scanning Sequence and Repetition Rate of Television Images."

The present invention, however, seeks to proceed still further in the art and to provide the same delineation, that is, detail and definition, as to the methods above described without any objectionable flicker. Further, the present system has for one of its principal objects that of overcoming flicker, while maintaining full detail and delineation without requiring the interlacing of linear elements, such as the component lines of a picture.

A still further object of this invention is to accomplish the desirable features of the presently known methods of transmission with more simple, stabilized operating, readily adjusted, and economically functioning apparatus, without in any way increasing the frequency spectrum required for transmitting a picture subject of any selected detail over systems already known in the art.

As a broad principle the method and system which is herein to be described may be defined not only as a composite delineation system of television but also as an interlaced-frequency-band transmission system. According to this method there are sent each second 60 partial-delineation pictures which form, in their totality, the equivalent of 30 fully delineated pictures. Such transmissions produce at each receiver point results equivalent with respect to picture detail and freedom from flicker to the results had by the second method described above, provided, of course, that such known method is in successful operation so that there is no so-called "line pairing" effect being realized.

The method to be herein described possesses many additional advantages over the prior art systems and one of the more apparent advantages is that of not requiring line interlacing or an interlacing timing which is based upon the line frequency. The changes in the delineation characteristic of the successive pictures in a system to be herein described will be seen to occur at the frame frequency in contrast to the line frequency, as above suggested.

As an illustrative example of the case to be herein described, if it is assumed that a 300-line picture is to be transmitted at the rate of 30 frames per second or as a 150-line picture field produced at the rate of 60 fields per second, depending upon where the first or second method previously described is to be used, it is to be seen that 9,000 picture lines are to be transmitted each second. On the other hand, the frame frequency is only 30 frames per second, or 60 partial-pictures or picture fields per second. Accordingly, the ratio of the two last mentioned quantities is large, that is, 150 to 1, and is something of a measure of the relative synchronizing difficulties of the interlaced-line method as compared to the interlaced frequency method, insofar as the production of a perfectly delineated flickerless picture is concerned.

According to the present invention, the method by which interlaced frequency band transmission of pictures may be accomplished, as described herein, provides that every partial-picture is scanned with its assumed full 300 lines of detail so that there will be scanned the same 120,000 picture elements per picture. However, this scanning takes place in 1/60 of a second so that the scanning rate of the present system normally provides for the scanning of 7,200,000 picture elements per second which corresponds in itself to a side-band of 3.6 m. c. This, it will be seen, appears to be double the side-band frequency produced and required by interlaced-line scanning methods for the assumed picture. Therefore, in order to halve the side-band required and thus to bring it back to equality with the interlaced-line scanning method or the sequential line scanning method, each requiring a side-band of 1.8 m. c., for the picture herein assumed for consideration, only ½ of the generated side-band is sent out with each partial-picture delineation. This frequency band reduction is one of the distinguishing and distinctive points with respect to the presently described method over those previously shown in the art.

With the transmission of each scanning of each picture field or frame limited to a transmission of one-half of the normally generated side-band frequency the procedure also requires displacing the position of the half side-band of alternate pictures in order that the same frequency band shall be occupied in the presently described method as in the systems heretofore used in the art.

Accordingly, for the transmission of the first picture the assumed 300 lines are scanned in 1/60 of a second so that there is produced what is the equivalent of a side-band frequency of 3.6 m. c. during this partial-picture scanning. Assume now that the first picture to be transmitted is to be a "low frequency picture" at the receiver, the video frequency currents generated from scanning are passed through a filtering system, or its equivalent, such that only the components varying between zero and 1.8 m. c. pass to the transmitter modulator and influence thereby modulated carrier. Thus, for the partial picture herein termed the "low frequency picture" there is sent out a transmission occupying no more than 1.8 m. c. This picture corresponds to the coarser delineation and the slower movements of the scene which is being scanned but it will be appreciated that the high frequency details will unquestionably be missing from this picture. However, it can be seen that such a transmission occupies no more width of side-band than is required for either of the two systems of the prior art above described.

Now, with respect to the second picture to be transmitted, that is, the "high frequency" picture, this picture is also one of 300 lines and again it is scanned in 1/60 of a second so that there is also produced for this second picture a side-band frequency of 3.6 m. c. The video output currents from this scanning which are generated are then passed through a bandpass filter or equivalent device whereby only those components of video frequency currents which are between the limiting values of 1.8 m. c. and 3.6 m. c. may be passed through. These higher frequency components of the produced video frequency are not sent directly into the transmitter modulating system since their utilization in that way would lead to the occupancy by the transmission of a wider frequency band than equivalent to that of the sequential line or interlaced-line methods of transmission, but in order that the frequency band requirement shall be the same as for sequential-line in interlaced-line methods of transmission, the components of scanning varying between 1.8 and 3.6 m. c. are reduced in frequency by heterodyning or any equivalent process, by an amount of 1.8 m. c. so as thus to occupy a displaced and reduced frequency band part from zero to 1.8 m. c.

This reduced frequency band is then sent to the transmitter modulator and controls the transmitter during the transmission of the second partial-picture which may be termed the "high frequency picture." The high frequency picture corresponding to the finer delineation and more rapid movements of the scene which is scanned is then overlaid and in registration with the "low frequency picture" previously transmitted. This process of alternate transmission of low frequency partial pictures and high frequency partial pictures continues but it will be seen that at no time with such a method does the transmitted side-band ever exceed 1.8 m. c., which is the maximum side-band frequency which will be produced either by sequential line or interlaced-line scanning, since the 1.8 m. c. modulation is the highest frequency which can at any time reach the modulator and transmitter. This is to be expected since the amount of intelligence (neglecting the effects of visual persistence in the presently proposed method) to be transmitted by any of these three methods is to be the same, but it will be seen that only by the interlaced-line method of the prior art or the interlaced frequency method herein described is flicker eliminated and further it will be appreciated that only the method last outlined herein permits an alternation of fluctuations at the picture frequency rate rather than at line frequency rate, which latter has already been pointed out herein as being much higher in frequency by the order of 150 times for the assumed number of picture lines and field repetition frequency.

In the reception of pictures transmitted in accordance with the above outlined transmission method, which will be referred to more fully hereinafter, the "low frequency picture" is received to control directly the intensity of the cathode ray beam which is developed within the cathode ray image reproducing tube in a manner which is well known in the art. Thus, the first partial picture which is to be reproduced will be the partial picture occupying the assumed frequency band varying between zero and 1.8 m. c. This low frequency partial picture will be reproduced in the first 60th of a second of the transmission period.

Next, there must be reproduced the second or high frequency partial picture. This picture is not reproduced exactly as received in the antenna circuit because to do so would mean the production of a badly garbled image representation. To overcome such factors a communtating device, which may be electro-mechanical or electronic, as may be desired, is arranged to operate at the picture frequency and is so arranged as to switch in the incoming signal which should be reproduced as representing picture frequencies varying between 1.8 m. c. and 3.6 m. c. into an alternative circuit where these signals are received and displaced in frequency by 1.8 m. c. This reversal, it will be seen, amounts to a reversal of the reduction of frequency at the transmitter and, accordingly, the received side-band frequencies varying between zero and 1.8 m. c become side-band frequencies, insofar as the receiver is concerned, which vary between 1.8 m. c. and 3.6 m. c.

This resultant signal, which can be developed readily by heterodyning the incoming signal for all second or high frequency partial pictures against an oscillator of say 3.6 m. c., is then applied to the beam intensity control electrode of the image reproducing cathode ray tube so as to produce the high frequency partial pictures.

In fact, these two pictures are superimposed upon one another insofar as the eye of the observer is concerned and obviously the alteration of the partial pictures in reception following the method above described then continues and constitutes the normal process of reception. In effect, the receiving method consists in dividing the total delineation which is to be required for the reduction of the complete picture into two appropriately selected portions which, as above described in connection with the transmission, comprise preferably the low frequency or the broad massing portion wherein a limited degree of high definition is contained on the one hand and, on the other hand, the high frequency or sharp edging picture wherein the high details and the sharp outlines of the subject matter are reproduced. Each half of the total delineation is transmitted half the time and alternately so that the total amount of intelligence remains unchanged from the systems of the prior art (but, considering the effects of visual persistence, not necessarily the same total amount of apparent received delineation).

In an alternative scheme provision is made by which during the scanning of the alternate pictures each separate picture field is scanned in the same detail as above suggested but the first picture field, if it is assumed that the frequencies developed vary between zero and 3.6 m. c., are so attenuated that alternate pictures include the band widths of say zero to 2.4 m. c. for the first picture field and 1.2 to 3.6 m. c. for the second picture field, while all subsequent odd picture fields may include the band width for the first picture field and all subsequent even picture fields may include the band width for the second picture field. From the above it will be seen that there is an overlap for each scanned picture field in the range between 1.2 m. c. and 2.4 m. c. because for the odd picture fields all frequencies between zero and 1.2 m. c. have been transmitted unattenuated and for all even pictures the band width between 2.4 and 3.6 m. c. has been transmitted unattenuated. Thus, for each picture field there is a certain portion herein designated as one third of the total frequency band initially developed from scanning which may be occupied by every picture field transmitted. It is readily apparent that this method of transmission will require a frequency band 25% in excess of that above suggested but the advantage of this type of transmission is apparent because of the fact that the delineation of the successive pictures is more nearly alike than in the case previously described and, therefore, the residual inter-picture flicker is further reduced. Such a method, therefore, includes overlapping modulation bands and naturally overlapping delineation in the successive pictures. As a still further alternative scheme (which is especially desirable where it is assumed that the delay characteristic of the picture-reproducing part, such as the fluorescent screen of a cathode ray tube, for example, has a delay characteristic of just slightly less than the 1/60 of a second herein assumed as the repetition rate of successive picture fields and wherein the visual persistence characteristic of the observer's eye is assumed to be just slightly over 1/30 of a second, that is, the frame repetition rate), it is possible to reduce the effects apparent to the observer from interference and the like by resorting to a method wherein for all odd picture fields the energy will be transmitted so as to be attenuated at a greater rate from zero cycles, where the assumed transmission modulation is 100%, down to 100% attenuation at the maximum frequency assumed for 3.6 m. c. but for all even picture fields the attenuation will be a maximum at zero frequency with substantially zero attenuation or 100% modulation at the maximum frequency of 3.6 m. c. In this way it can be seen that what is produced in effect, insofar as the observer's eye is concerned, is a transmitted picture wherein the observed effect would correspond to an average of 50% modulation, although the actual modulation for every picture field transmitted may be varied between 100% and zero percent. The adjacent-band interference produced by such signals will be less than for signals having 100% modulation of each picture at all frequencies.

Still a further modification which falls closely within the method utilizing overlap between the two frequency bands hereinabove described would provide for a system wherein in contrast to a relatively sharp cut-off at 2.4 m. c. for the odd picture fields and 1.2 m. c. for the even picture fields, there may be a gradual attenuation of all frequencies for the odd picture fields which lie between 1.2 and 2.4 m. c. so that all picture frequencies in excess of 2.4 m. c. for the odd picture fields are completely attenuated, whereas for the even picture fields there is complete attenuation of all picture frequencies between zero and 1.2 m. c. with an increase of signal strength between 1.2 and 2.4 m. c. with completely unattenuated transmission for the frequency range between 2.4 and 3.6 m. c.

Such a method of transmission, it will be appreciated combines that above described involving overlapping delineation and that also described above involves systematically attenuating delineation and, therefore, provides a system for reproducing picture images and the like wherein the sharpness of distinction between successive picture fields is reduced and a more pleasing effect in observation (with further reduction of inter-picture flicker) is maintained.

It, of course, will be appreciated that there are various methods by which these results may be accomplished and while several of the preferred forms have been shown by the drawings, naturally, it is possible to vary within wide limits the complete assembly and the manner in which the pictures are transmitted and received. However, under any conditions, it will be noted, that there must be a correspondence at the receiver to the particular picture which is being transmitted at any moment so that the path traced by the receiver cathode ray beam for the low frequency picture, for example, must correspond to the scanning of the low frequency picture at the transmitter. Similarly, the same conditions should obtain with respect to the high frequency picture. However, it is to be noted that once the receiver is in operation this can be provided for and arranged with little inconvenience by simply having a suitable reversing switching which can be manually operated for changing or reversing the phase of the commutating device which selects between high and low frequency picture components.

If at the transmitting station the phases are not changed throughout the complete program the adjustment at the receiver end of the system need be made only once and further it is also possible in the transmission to precede each partial picture prior to the start of the actual transmission, for example, by an identifying signal which may control an automatic commutating circuit of the receiver. Various ways and means by which these and other ancillary objects and results may be accomplished have been shown in schematic form by the accompanying drawings of which Figure 1 illustrates conventionally a suitable arrangement for the transmitter;

Figure 2 represents a partial transmitter circuit of a modified form from that shown by Fig. 1;

Figure 3 illustrates generally a conventional representation of a receiver for receiving the transmissions sent from the arrangements of Figs. 1 or 2;

Figures 4 and 5 represent still further modifications of the transmitter arrangement of Fig. 1;

Figures 6, 7 and 8 are schematic representations of the distribution of signal frequencies between odd and even pictures for the transmitter arrangement of Figs. 1 or 2, Figs. 4 and 5 respectively;

Figures 9, 10 and 11 diagrammatically illustrate the principles involved in providing for the transmissions with overlapping delineation, systematically attenuated delineation, and both overlapping and systematically attenuated delineation respectively; and Figure 12 represents a modification of the receiver of Fig. 3 wherein provision is made in a common receiving instrumentality for receiving television images transmitted by utilizing sequential line or interlaced line transmitting methods as well as for receiving transmission of interlaced frequency band pictures.

In each of Figs. 6 through 11 portion (a) indicates the relative frequency band occupied by the assumed odd picture fields with the shaded portion of each curve indicating the assumed maximum transmitted energy or percentage of modulation allocated to the suggested frequency band and in each of these figures portion (b) indicates the same conditions but applied to all assumed odd picture fields.

Making reference now to the drawings for a further understanding of this invention, the picture signals are assumed to be developed by way of an electron image scanning tube of any suitable form such, for example, as that described by Dr. V. K. Zworykin in an article entitled "The Iconoscope" commencing at page 16 of vol. 22, No. 1, Proceedings of the Institute of Radio Engineers for January 1934 and particularly to the general form of apparatus shown and described commencing on page 24 of the aforesaid publication. The transmitted image signals are also assumed herein to be reproduced by purely electronic means, such as a cathode ray reproducing tube, and such tube, for example, may be of the general form described by the aforementioned Dr. Zworykin in the Proceedings of the Institute of Radio Engineers, vol. 21, No. 12, for December 1933 in an article entitled "Description of an Experimental Television System and the Kinescope," starting on page 1655 of this publication. As has been known in the art, transmissions may originate by virtue of image pick-up by the image scanning tube of the aforesaid character by direct pick-up or the image signals may originate by virtue of scanning printed or pictorial subject matter or motion picture films in a manner which has already been used experimentally.

With the foregoing conditions in mind the subject 1, which may be a film or other object of which the electro-optical reproduction is desired at receiving points, is projected by a suitable optical system 3 onto the light responsive mosaic electrode 5 of the image scanning tube 7. In one end of the image scanning tube 7 there is provided an electron gun 9 of known form from which an electron scanning beam 11 is adapted to be projected so as to strike the illuminated side of the mosaic electrode 5 in order that the electrical replica of the subject 1 produced upon the mosaic electrode may be scanned. Scanning is accomplished by virtue of the application of suitable deflecting currents passed through the deflecting coils 13, 13' and 15, 15'. Such currents for deflecting the cathode ray beam 11 across the illuminated side of the mosaic electrode 5 are, according to the usual practice, of such wave form that a saw-tooth of current is forced through the deflecting coils so that the beam or cathode ray 11 is moved relatively slowly across the mosaic electrode in one direction and returned rapidly, say for line scanning, while the other component of motion is also accomplished, slowly with a rapid return, so that two dimensional objects may be scanned.

As has already been described by Dr. Zworykin, the mosaic electrode 5, is illuminated by the light of the subject 1 being directed thereto by way of the optical system 3. The mosaic electrode usually comprises a signal plate 17 carrying suitably arranged light responsive particles or elements supported upon an insulating element 21 which is in turn carried by the signal plate 17. There is no measurable lateral conductivity between the multiplicity of minute size photoelectrically responsive particles 19. Therefore, in accordance with the intensity of light of the subject 1 striking the mosaic electrode, various charges are accumulated and held between the photoelectric elements 19 and the signal plate 17. Scanning by the cathode ray beam 11 causes these charges to be released to an external circuit by way of the conductor 23 connected to the signal plate 17. The conductor 23 supplies its energy to the input circut of a video frequency amplifier 25 whose output is arranged to be switched in accordance with each vertical or slow motion deflection of the cathode ray beam between two signal utilization circuits, later to be described.

Such switching action may be accomplished, for example, by means of an electronic switching system of the type already described in the Roys and Mayer patent of August 10, 1937, #2,089,430, or in the H. M. Strobel patent, #1,757,345 of May 6, 1930, or by a mechanical switching means shown as conventionally as the switching means 27.

A typical form of mechanical switching means comprises the rotary commutator portion 29 composed of the two commutator segments 31 and 33 to which the signal output of the video frequency amplifier 25 is supplied by way of the conductor 35 and the brush 37. The commutator 29 is rotated in the direction of the arrow by any suitable prime mover (not shown) so as to rotate, say at the rate of 30 revolutions per second (half the vertical scanning frequency assumed). Of course, it will be noted in this connection that the prime mover which rotates the switching means 27 should be such that the segments 31 and 33 are brought under the brush 37 synchronously with the beginning of the frame deflection cycle so that there is provided an appropriate interlock between the switching and the frame deflection rate as will be apparent from what has been shown in connection with Fig. 12 and particularly with respect to the element 286 thereof. In this way as the commutator 29 is rotated, the segments 31 and 33 will successively and sequentially come beneath the brush 37 so that energy representing video signals is applied thereto. There is a connection from the commutator segment 31 to the slip ring 39 by way of the conductor 41 and, similarly, there is a connection to the slip ring 43 by way of the conductor 45. Upon each of the slip rings 39 and 43 brushes 47 and 49 are adapted to rest so that when the output energy of the video frequency amplifier 25 is supplied by way of the brush 37 to either commutator segments 31 or 33. This energy will be supplied to one of the slip rings 39 and 43.

As shown, by Fig. 1, with the brush 39 making contact with the commutator segment 31, energy is supplied to the slip ring 39 and by way of the brush 47 and the conductor 51 is fed to a high-pass filter 53. As the commutator segment rotates slightly in the direction shown by the arrow, it will be apparent that the output energy from the video frequency amplifier 25 will be fed by way of the brush to the commutator segment 33, whereupon by virtue of the slip ring 43 and the brush 49, energy will be fed through the conductor 55 so as to be supplied to the low-pass filter 57. As shown, the slip rings 39 and 43 are connected to rotate with the commutator 29; although it is, of course, in no way essential, since the switching may be carried on by merely rotating the commutator itself.

Any energy entering into the low-pass filter 57 which is of a frequency higher than 1.8 m. c., hereinabove assumed, as the maximum frequency of the coarser delineated picture, will be attenuated and all frequencies varying between zero and 1.8 m. c. will be passed through the filter 57 to the video frequency amplifier 59 and, after suitable amplification, fed by way of the conductor 61 to the modulator 63. Similarly, for alternate picture fields, where the finely delineated picture is to be transmitted, it is apparent from what has been above stated that all frequencies varying between zero and 1.8 m. c. are to be attenuated. Accordingly, energy entering the high-pass filter 53, which is of a frequency higher than the assumed dividing value of 1.8 m. c. and herein assumed to vary as high as 3.6 m. c., will be passed through the high-pass filter 53 to enter the video frequency amplifier 65. It is apparent, if all frequencies between zero and 1.8 m. c. are stopped or attenuated by the filter 53 and that frequencies between 1.8 m. c. and 3.6 m. c. are transmitted, that the frequency band width of the energy entering the video frequency amplifier 65 will also not exceed 1.8 m. c. which was the frequency band entering into the video frequency amplifier 59.

However, the energy distribution of the energy impressed upon the video frequency amplifier 65 is allocated to a different portion of the frequency spectrum from that fed or supplied to amplifier 59 but, with the frequency variation having a maximum value of 1.8 m. c., it is apparent that by providing suitable means for shifting this energy to a different portion of the frequency spectrum that the same spectral width and the same location in the spectrum of the energy may be made possible. Accordingly, the output of the video frequency amplifier 65 is supplied a mixer tube 67 so as to be impressed, for example, upon the control grid of such a mixer tube. The well known use of the mixer tube, while not herein specifically illustrated, may be, for example, of the type known as a screen grid tube wherein the controlling energy is supplied upon the control electrode and that with this energy may be allocated to the portion of the frequency spectrum varying between zero and 1.8 m. c. The impressed energy is heterodyned with the frequency of a local oscillator 69 whose oscillation frequency is normally maintained constant through suitable control such as, for example, by a piezo-electric control at 3.6 m. c. Thus, by the heterodyning effect, the output from the mixer tube 67 will be of a frequency 3.6 plus or minus (1.8 to 3.6) or, in other words, if the lower side band is to be separated from the upper side of the energy developed as by means of a low frequency filter 71, there may be selected the side band frequency of zero to 1.8 m. c. which is then fed by way of the conductor 73 to the modulator 63.

It is apparent from the switching action, provided by the commutator 29, having the two segments 31 and 33 alternately connected to the video frequency amplifier 25 and where the rate of field scanning of the mosaic electrode 5 is at 60 fields per second and the therewith synchronized switching and the rotation rate of the commutator 29 is at 30 revolutions per second that the switching between the channels which supply the energy to the low-pass filter 57 and to the high-pass filter 53 occurs at the field frequency rate. Hence, from what has been stated above, it is apparent that the energy supplied to the modulator 63 is first from one channel and then from the other channel but always of a frequency which varies between zero and 1.8 m. c. In order that the energy supplied to the modulator may be transmitted, the modulator 63 is arranged to modulate the carrier frequency oscillator 75 and the modulated energy is then transmitted by way of a radiating antenna 77, or, where desired, the transmission may take place over the usual and known type of co-axial cable, or its equivalent, to desired points of reception or to points of re-transmission.

A modified form of transmitter system has been shown by the arrangement of Fig. 2 and in this figure for simplicity and illustration only that portion of the complete transmitter between the video amplifier 25 and the modulator 63 has been illustrated. It is the purpose of the arrangement of Fig. 2 to replace all of the electro-mechanical equipment of Fig. 1 by purely electronic type apparatus. For this purpose there is provided, as will be seen from the description which is to follow, a picture frequency source which is usually the power supply frequency, say 60 cycles, as well as a suitable phase reverser and biasing arrangement for connection to the video frequency amplifiers similar to the amplifiers 59 and 65 of Fig. 1.

In the arrangement illustrated the signals from the signal plate 17 of the image transmitting tube 7 are supplied by way of the conductor 23 to the video frequency amplifier 25, as by the arrangement of Fig. 1. Through the conductors 35' and 35'' these signals are supplied to each of the video frequency amplifiers 59 and 65, these amplifiers having characteristics similar to those amplifiers shown in Fig. 1.

As above noted, the picture frequency source 79 is preferably a synchronized generator of alternating current and since it is desirable that the frequency of such developed currents correspond to that of the partial pictures or the picture fields scanned by the scanning tube 7 and that the phase of the generator or picture frequency source 79 correspond to that at which the picture fields are scanned in the scanning tube 7, the picture frequency source can be considered for convenience as the power supply frequency which is suitably interlocked with the deflection frequency. The interlock between the deflection of the cathode ray beam 11 as it scans the mosaic electrode 5 of the image scanning tube 7 is already known in the art and has been explained in copending application of John Paul Smith, Serial No. 748,773, filed October 18, 1934. In the aforesaid Smith application the assumed 110 volt, 60 cycle power supply energy is compared with the field scanning frequency developed from suitable multi-vibrator units in order that co-phasal operating conditions may be attained. For the interlock between the power supply frequency or the picture frequency source 79 herein as especially applied to odd line pictures (say 301 lines) or for the interlock between the deflection frequencies applied to the coils 13, 13' and 15, 15' of Fig. 1, reference is made to the aforesaid Smith application, as well as to all other features covered thereby and applicable to this disclosure.

The output from picture frequency source 79 is then supplied to a frequency halver 81 which may be of the multi-vibrator type such as has been provided in the Smith application above named for obtaining sub-multiple frequencies, it being understood, of course, that the circuit parameters selected for such multi-vibrator unit shall be such as to produce in the output of the device 81 a frequency which is half of that of the picture frequency source 79 and this frequency it will be noted will be in proper phase relationship with that of the source 79. Of course, it will be apparent that the combination of the picture frequency source 79 and the frequency divider 81 may be replaced by any synchronized and equi-frequent source capable of supplying an appropriately timed correctly valued pair of biasing voltages which shall be alternately connected to the control electrodes of the video frequency amplifiers 59 and 65.

It will also be noted in connection with the disclosure of Fig. 2 that the output energy from the frequency halver or frequency divider 81 is fed by conductors 83 and 85 respectively to the video frequency amplifier 59 and the phase reverser 87 from which the output energy is supplied to the control electrode of the first tube of the video frequency amplifier 65. However, it will be noted that the polarity of the voltage supplied to the control electrode of the first tube of each of the video frequency amplifiers 59 and 65 is at all times different in that the phase of the control energy supplied to the amplifier 65 is reversed with respect to that supplied to the amplifier 59 from the frequency divider 81. This causes the amplifiers 59 and 65 alternately to become active and to permit the passage therethrough of the video frequency output of the amplifier 25 as supplied to the amplifiers 59 and 65 by the conductors 35' and 35'' respectively, and by the phase reversing arrangement 77 provision is made so that one of the amplifiers 59 and 65 is active or held in an operative state and the other is inactive or held in an inoperative state. Thus it can be seen that alternately the outputs from the video frequency amplifiers 59 and 65 are supplied respectively to the low-pass filters 57 and 53 which have characteristics substantially identical to the filters shown by Fig. 1. In the arrangement of Fig. 2 the energy varying between the assumed frequency values of zero and 1.8 m. c. forming the output from the low-pass filter 57 is fed to the modulator by way of the conductor 61 and in a manner similar to that explained in connection with Fig. 1 the output from the high-pass filter 53 and being of a frequency range assumed to vary between 1.8 and 3.6 m. c. is fed directly to the mixer 67. In connection with the modified arrangement of Fig 2, it will be noted, that the output energy from the filters 57 and 53 passes directly either to the modulator or mixer without amplification, in view of the fact that the amplifiers 59 and 65 respectively are shifted in location so that the energy supplied to the filters is amplified first. Consequently, the output energy from the high-pass filter 53 after having been reduced in frequency by the frequency reducing oscillator 69 is also supplied by way of the low frequency filter 71 to the modulator 63 through the conductor 73 as was explained by the arrangement of Fig. 1.

The relative frequencies which are assumed to be passed through each channel to the modulator, that is, for example, the lower frequencies assumed herein to be zero to 1.8 m. c. passing through the output conductor 61 and the higher frequencies assumed to be representative of the frequency band 1.8 to 3.6 m. c. arranged to appear in the conductor 73 connected to the modulator as also being within the range zero to 1.8 m. c. are indicated schematically in their relative locations in the spectrum by Fig. 6. In this figure, it is assumed that the curve (a) represents all odd picture fields and that the curve (b) represents all even picture fields. When the frequency band represented by the curve (b) of Fig. 6 is beaten against an oscillator having a frequency of 3.6 m. c. it, of course, will be appreciated immediately that by selecting one of the two side-bands developed and filtering out the other that the resultant frequencies may also be assumed effectively to lie in the range zero to 1.8 as previously described.

In connection with Figs. 9, 10 and 11 still further modifications of the invention have been illustrated although the illustration is confined to a graphical representation of the relative frequency bands since the characteristics of the constituent parts of the transmitter apparatus are not changed from an operating standpoint, although to satisfy the selected frequencies the parameters of the system and particularly the filters necessarily are changed. In reference to Fig. 9, curve (a), like curve (a) of Fig. 6a, represents the frequency band for all odd picture fields and curve (b) represents the initially produced or effectively utilized frequency band for all even numbered picture fields, it being understood, of course, that these frequencies, indicated by shaded portions of each curve, represent the frequencies supplied to the video amplifiers 59 and 65, for example, in accordance with the arrangement of Fig. 1 or these frequencies represent the outputs from the filters 57 and 53 appropriately modified in accordance with the difference in frequency spectrum occupied by the shaded portions of each of these curves.

It was above suggested that in some instances it is desirable to overlap the frequencies developed from scanning both the odd and the even picture fields in order to produce what might be termed overlapping delineation. If the low-pass filter 57 of Fig. 1 may be assumed to be modified as to frequency range from that illustrated by Fig. 6 so that it passes all frequencies from zero to say 2.4 m. c. and similarly the high-pass filter 53 is modified so that it accepts frequencies as low as 1.2 m. c., as well as all increasing frequencies up to 3.6 m. c. then it will be seen that the frequency of the output energy supplied to the video amplifier 59 for the overlapping delineation transmission system will be in accordance with curve (a) of Fig. 9 while the input to the video amplifier 65 of Fig. 1 under the same conditions will be represented by all frequencies lying within the shaded portion of curve (b) of Fig. 9. Of course, it is obvious that this method may also be applied in accordance with the above teachings to the modification shown by Fig. 2.

It will also be appreciated that when utilizing the method of transmission explained particularly by reference to Fig. 9 that the frequency spectrum for the assumed picture is expanded by one-third over that suggested with the arrangements of Figs. 1 and 2.

In a still further form of the invention it is also possible to provide for systematically attenuated delineation which has been conventionally illustrated by the curves of Fig. 10. It was also explained above that this method would require double the frequency band necessary for carrying out the transmission described by Figs. 1 and 2. However, in some instances this is desirable in order that less interference with simultaneous transmission on adjacent channels would result than in the case of signals of maximum modulation at all frequencies because obviously the effect of the method of Fig. 10 is to produce a signal for each picture field having average modulation of the order of 50% and, therefore, the double band width available is frequently desirable as a means of reducing adjacent-channel interference.

Referring now more particularly to Fig. 10 with the method described, it will be apparent that the attenuation in the filters 57 and 53 is such that for the odd picture fields the attenuation gradually increases until it reaches a maximum at the maximum frequency, whereas for the even picture fields the attenuation is at a maximum at the lower frequencies and substantially at a zero value at the maximum frequencies. Curve (c) of Fig. 10 merely indicates the relative shift in the frequencies produced in the output of the mixer stage 67 for the even numbered picture fields.

A still further modification has been suggested by a method according to Fig. 11 where there is provided both overlapping and systematically attenuated delineation. In this arrangement and method it will be apparent that the characteristics of the filter 57 are so adjusted that the attenuation of all frequencies varying between zero and about 1.2 m. c. is substantially negligible while the frequencies higher than 1.2 m. c. become attenuated until the attenuation becomes a maximum at about 2.4 m. c., the characteristic, of course, being substantially or approximately linear as to attenuation between 1.2 and 2.4 m. c. for all of the odd picture fields. Similarly, referring to the method of Fig. 11 back to the system shown by Fig. 1, the characteristics of the filter 53, with respect to all of the even numbered picture fields, are such that the attenuation is a maximum in the frequency range between zero and 1.2 m. c. while the attenuation of the filter in the frequency range between 1.2 and 2.4 m. c. is gradually decreasing according to a substantially or approximately linear function until the attenuation becomes negligible at 2.4 m. c. and the frequencies between 2.4 and 3.6 m. c. for the even picture fields are passed through substantially unattenuated. This method, it will be apparent, differs substantially from that described by Figs. 9 and 10 and provides only for overlapping in the frequency range between 1.2 and 2.4 m. c. but, at the same time, in this frequency range the method of Fig. 11 provides for transmission so that the modulation shall never exceed 100% and may indeed average 50%. Curve (c) of Fig. 11 represents the frequency band indicated by curve (b) shifted in location so that the frequencies supplied to the modulator by way of the conductor 73 shall be within the same range as provided by the transmission of the frequencies indicated by curve (a) through the conductor 61 to the modulator.

One suitable form of receiver device for receiving the signals transmitted from the transmitting arrangements shown by Fig. 1 or Fig. 2, for example, has been illustrated by the conventional representation of Fig. 3. In that showing the various radio frequency selectors, amplifiers, detectors, oscillators, frequency halvers and phase reversers and the like are of substantially standard form and, therefore, each has been illustrated merely in diagrammatic manner. Accordingly, reference to the general form of these arrangements described in connection with Figs. 1 or 2 is made and, therefore, reference to well known prior art uses of devices of such character is also made.

In the preferred form of the embodiment the signals transmitted from the antenna system 77 of Fig. 1, for example, are received upon a receiving antenna 201 from which they are supplied to a radio frequency selector 203. This radio frequency selector, for example, may be of the general type disclosed by U. S. reissue patent of Carlson No. 20,700 dated April 19, 1938, where it is desired, for example, to receive simultaneously all of the video, audio and control signals upon a single detector circuit and wherein through the use of a suitable oscillator the video and audio signals, with the desired control signals accompanying the video signals, result in the production of a plurality of separate intermediate frequencies which may be independently amplified. This complete arrangement has not herein been shown for the reason of a desire for simplicity of operation, although it is to be understood that reference to the Carlson patent, for example, is made for a full and complete disclosure of this portion of the receiver system, as well as suitable automatic volume control arrangements. In connection with the receiver of Fig. 3 it should be understood that the selector 203 may be any of a tuned antenna, a filter, a tuned amplifier or any combination thereof. Further, where desired detection of the incoming signals may take place intermediate the selector 203 and the video amplifier 205.

Whenever signals are received by the radio frequency selector and suitably detected so as to appear in the form of intermediate frequency signals, these signals are suitably amplified in the video frequency amplifier 205 and are then fed by way of the conductor 206 to the video frequency amplifier 207 and by way of the branch connection 208 to the video frequency amplifier 209. In this connection the amplifier 205 serves primarily as a buffer although it functions equally well as a combination buffer and amplifier in that it acts as a one-way repeater and prevents reaction on the selector stages frequently causing re-radiation and/or de-tuning. As was explained in connection with the transmitter arrangement of Fig. 2, the picture frequency source 211 is arranged to correspond substantially to the picture frequency source 79 of Fig. 2. Such a source may comprise, for example, a synchronized generator of A. C. type which thus should be of the same frequency as the picture frequency source 79 of the transmitter arrangement. The output from the picture frequency source 211 is supplied to a frequency halver 213 which is of the same general nature as the frequency halver 81 shown in connection with the transmitter arrangement of Fig. 2 and is constructed and operated in a manner substantially like that described in connection with the transmitter. A portion of the output from the frequency halver 213 is fed by way of the conductor 214 to the video frequency amplifier 207 and the remaining portion of the output is fed by way of the conductor 215 to the phase reverser 217 corresponding to the phase reverser 87 shown in connection with Fig. 2 of the transmitter. This phase reverser, as in the transmitter end of the system, may comprise merely a single tube in addition to the video frequency amplifier so that the polarity of the output signal which is supplied to the video frequency amplifier 209 from the phase reverser 217 is opposite to that signal which is supplied to the video frequency amplifier 207 by way of the conductor 214.

In this form of arrangement the signals which are received on the video frequency amplifier 205 are fed to both the video frequency amplifiers 207 and 209 but in view of the control exercised on these video frequency amplifiers from the output of the frequency halver 213, it can be seen that for alternate picture fields, which in accordance with the transmitter arrangement of Fig. 1 or 2 represent first an assumed frequency range of zero to 1.8 m. c. for say the odd picture fields and then a frequency range of 1.8 to 3.6 m. c. for say the even picture fields serving to so connect the video frequency amplifiers 207 and 209 that they are alternately responsive to the signal frequencies representing alternate picture fields. Thus the video frequency amplifier 207 being rendered operative during the transmission of the odd picture fields is capable of amplifying only those signals which are received during the scanning of the odd picture fields while during this period the video frequency amplifier 209 is inoperative or biased to cut-off so that it cannot amplify any of the received signals. Consequently, picture or video signals representing the odd picture fields after having been amplified in the amplifier 207 are passed through a low-pass filter 219 having the cut-off range designated by the diagrammatic showing so that there is supplied to the detector 221 signals representing the low frequency components of the complete picture. Similarly, with the amplifier 209 being rendered operative during the odd picture field scannings and the amplifier 207 during these time periods biased to cut-off so as to become inoperative, all of the high frequency components are amplified by the video frequency amplifier 209. It should be understood that the mode of alternately activating amplifiers 207 and 209 herein disclosed is illustrative, and that any equivalent controllably timed system of activating these amplifiers alternately may be used. Similarly, there is supplied to the mixer 223 the output from the video frequency amplifier 209 and the output from an oscillator 225 which is developing energy at a frequency of 3.6 m. c. This causes a heterodyning action with the signal output from the video frequency amplifier to take place in the mixer and, consequently, the received signals which are amplified in this channel of the receiver system represent only the higher frequency components as shown by curve b of Fig 6. The output from the mixer 223 is then supplied to the detector 227. The output energies from the detectors 221 and 227 are fed by way of conductors 222 and 228 respectively so as to unite in a common conductor 224 in order to be supplied to the control electrode 226 of a cathode ray tube 231. As shown by Fig. 12 a stage of D. C. amplification may be used in the lead 224 to supply energy to the control circuit of the tube 231. Further, where desired the detectors 221 and 227 may be a single detecting element, as also shown by Fig. 12. Within the cathode ray tube 231 there is provided the combination of an anode 229 and a cathode 230, which, together with the control electrode 226, form an electron gun which when suitable energies are applied in a manner which is known in the art causes a cathode ray beam 232 to be developed. This cathode ray beam impinges upon the target or luminescent screen 233 of the tube 231 and causes the production of electro-optical image effects whose spatial position is controlled by means of the deflecting coil combinations 234, 234' and 235, 235'.

All signal outputs from the detectors 221 and 227 when supplied to the control electrode 226 cause a control in the intensity of the cathode ray beam 232 so that the intensity of the resultant luminous effects produced on the target or luminescent screen 233 is obtained. The spatial position of the cathode ray beam 232 as it impinges upon the target 233 is controlled in synchronism with the motion of the cathode ray beam 11 of the transmitter tube 7 and the currents which flow through the deflecting windings 234, 234' and 235, 235' correspond in phase to the currents flowing through the deflecting windings 13, 13' and 15, 15' of the transmitter tube, for example. The matter of transmitting and producing these deflecting currents per se forms no part of the present invention and, accordingly, reference is made for a complete understanding of what has herein been disclosed to the aforesaid Smith application, as well as the Carlson patent, and the publications of the prior art already mentioned herein. The arrangements for separating the synchronizing signals and for developing the control energy therefore has been explained in the citations above mentioned and, therefore, has been omitted from the showing in this disclosure for the sake of simplicity.

As a further modification of various arrangements for transmitting the energy and for varying slightly the range of frequencies developed in each portion of the system, it is, of course, apparent that the cut-off range for each of the filters 57 and 53 of the transmitter need not be rigorously maintained within the picture ranges of zero to 1.8 m. c. and 1.8 to 3.6 m. c., since this is naturally capable of reasonably wide variations. Two such variations are shown, for example, by the conventional representations of Figs. 4 and 5 which illustrate schematically certain portions of the transmitter arrangement and whose frequency ranges for overlapping time periods are shown respectively by the schematical representations of Figs. 7 and 8.

By Fig. 4, for example, the odd picture fields are indicated as carrying all signal frequencies originally between zero and 0.9 m. c. and also between 2.7 and 3.6 m. c., while the even picture fields, for example, are assumed as carrying all picture frequencies originally between 0.9 and 2.7 m. c. So constituted, it can be seen that the odd picture fields may then be transmitted to comprise only the lowest and the highest frequencies, while the even picture fields are caused to comprise the intermediate frequency range. The relationship between the various portions of the transmitter of Fig. 4, as to the division of frequencies between the odd and the even picture fields can best be appreciated from a consideration of Fig. 4, together with Fig. 7.

In this arrangement, it will be seen, for example, if the arrangement of Fig. 4 is related to that of Fig. 1, for simplicity of explanation, that the conductor 55, instead of feeding its energy as in Fig. 1 to the low-pass filter 57, feeds energy jointly to the low-pass filter 87 and the high-pass filter 89. Its output energy is thus transmitted unmodified, or, in the sense of this invention, it may be regarded as having been heterodyned against an oscillator of frequency of 0, the lowest frequency present originally in the output. The low-pass filter is assumed to have a cut-off range varying between zero and 0.9 m.c., while the high-pass filter, as is evident from a consideration of Fig. 7, is assumed to have a range of transmission varying between 2.7 and 3.6 m. c. The output energy from the low-pass filter 87 is supplied by way of the conductor 91 to the modulator 63 with or without amplification as provided by the video frequency amplifier 59 of Fig. 1. The output energy from the high-pass filter 89 is fed into the mixer 93 to which is also supplied the output energy from an oscillator 95 of generally similar characteristics to the oscillator 69 of Fig. 1 except that the frequency of the energy developed from the oscillator 95 should be for the assumed frequency range of a value of 1.8 m. c. The resultant energy output from the mixer 93 is then fed by way of the conductors 96 and 92 with or without further amplification as is necessary also to the modulator 63. With the modification of Fig. 4 the energy output which is fed by way of the conductor 51 in the arrangement of Fig. 1 to the high-pass filter 53 is supplied also to a band-pass or high-pass filter 97 whose characteristics differ from the filter 53 of Fig. 1 in that the responsive frequency range is assumed to be of the order of 0.9 to 2.7 m. c. This then transmits the intermediate range of frequency which are assumed for the even numbered picture fields. The output from the filter 97 is then supplied to the mixer 99 which is also energized from an oscillator 101 which is of generally similar characteristics to the oscillator 95 except that the oscillator 101 is assumed to develop energy of a frequency of 0.9 m. c. which will be heterodyned with output from the filter 97. The energy output from the mixer 99 is then fed by way of the conductor 100 also to energize the modulator 63. The remaining portions of the circuit of Fig. 4 correspond generally to those shown by Fig. 1.

In a still further modified form of the arrangement, it will be seen that alternate picture fields may, as diagrammatically indicated by Fig. 8, comprise portions of the entire frequency spectrum varying within small limits and overlapping one another. Thus, for example, as can be seen from Fig. 8, all of the odd numbered picture fields include, for example, those frequencies varying between zero and 0.6 m. c., those frequencies between 1.2 and 1.8 m. c., as well as those frequencies between 2.4 and 3.0 m. c. All energy of frequencies not included within the range of the transmission for the odd picture fields are then transmitted during the time period within which the even numbered picture fields are transmitted so that as also can be seen from curve b of Fig. 8 for each even numbered picture field the range of transmission frequencies includes those frequencies between 0.6 and 1.2 m. c., those frequencies between 1.8 and 2.4, as well as those frequencies between 3.0 and 3.6 m. c. In each instance, of course, it is assumed that the detail and repetition rate is as initially assumed in these considerations as was also the case in connection with the discussion of Fig. 4.

Referring now further to Fig. 5, for a further understanding of the general nature of the transmitter arrangement when the characteristics of transmission are as shown by Fig. 8, the energy output fed by way of the conductor 55 is supplied simultaneously to the filters 103, 105 and 107. These filters respectively are capable of passing frequencies of the order of 0.6 m. c., frequencies of the order of 1.2 to 1.8 m. c. and frequencies of the order of 2.4 to 3.0. All output signals from the filter 103 are fed by way of the conductor 109 with or without amplification as desired so as to combine in the conductor 111 with the output from the other filters herein to be described, so as to energize the modulator 63. In view of the fact that the filter 105 was arranged to pass frequencies varying between 1.2 and 1.8 m. c., this transmitted energy is fed by way of the conductor 113 to a mixer 115 which is also energized from an oscillator 117 whose output is of a frequency of 0.6 m. c. so that the resultant heterodyned energy is fed by way of the conductor 119 through a suitable amplifier, if desired, to combine in the conductor 111 with the output from the filter 103 and energize the modulator. Similarly, output energy from the filter 107 is supplied by way of the conductor 121 to the mixer 123 and is also energized from an oscillator 125 developing energy at 1.2 m. c. so that the heterodyned output from the mixer 123 may be fed by way of the conductor 127 and the common conductor 111 to energize the modulator 63.

For the even picture field scannings the energy fed by way of the conductor 51 of Fig. 1 is supplied in contrast to the filter 53 of Fig. 1 to three separate filters 129, 131 and 133 which have frequency ranges of response varying respectively from 0.6 to 1.2 m. c., from 1.8 to 2.4, and from 3.0 to 3.6 m. c. In connection with the high frequency components of picture scanning, it will be noted that in contrast to supplying the output from the lowest frequency range filter directly to the modulator it is necessary, in view of the fact that the frequency passed through each filter is greater than a minimum of heterodyning the output from each of these several filters. Accordingly, the output energy from the filter 129 is fed by way of the conductor 135 to energize the mixer 137 to which is also supplied the output from an oscillator 139 which develops energy at a frequency of 0.6 m. c. and the heterodyning output is then fed through conductor 141 and 143 to energize the modulator 63. Similarly, the output from filter 131 is fed by way of conductor 145 to the mixer 47 which is also energized from an oscillator 149 developing energy at a frequency of 1.2 m. c. so that the heterodyning output from the mixer 147 may be fed by way of the conductors 151 and 143 to the modulator 63. The highest frequency components of picture scanning, as represented by the output 133, are fed by way of conductor 153 to the mixer 155 which is also energized from an oscillator 157 whose output frequency is 1.8 m. c. This provides in the output mixer the heterodyning output of the highest picture components and these are supplied by way of the conductor 159 and the conductor 143 to modulate the modulator 63. The process consists essentially in dividing the frequency range of the video output of each picture transmission into separated frequency bands by means of filters, and then in effect compressing these bands into contact as a continuous band by means of a series of appropriate heterodynings, mixings, and recombination.

By Fig. 12 there is shown a receiving instrumentality capable through the use of suitable selected switching means of receiving television signals radiated or distributed from transmitting points using, on the one hand, the so-called "sequential line" or "interlaced line" methods of transmission and corresponding types of reception and, on the other hand, using the form of "interlaced picture" or field transmission method and suitable receiving means therefor, as described in the foregoing pages of these specifications.

In the form of receiver apparatus disclosed schematically by Fig. 12 of the drawings and for which further reference as to certain specific details and assemblies may be made to the aforesaid Carlson Reissue Patent #20,700, the signals distributed from the point of transmission are received, as in the arrangement of Fig. 3, upon a receiving antenna 201 or by way of a suitable wire connecting channel linking the receiver and the selected points of transmission. The received signals are then passed through to a radio frequency selector 203 whose output is supplied to a first detector 202 in which heterodyne detection is provided by reason of the oscillator 204 also feeding its energy into the detector 202. The receiver arrangement of Fig. 12 is thus capable of receiving both the video and the accompanying sound signals when these signals are transmitted in accordance with the method suggested by the aforesaid Carlson patent. In so doing the frequency of the oscillator 204 is preferably varied simultaneously with the tuning of the radio frequency selector 203 so that the resultant intermediate frequencies appearing in the output of the detector 202 are within the same frequency range. The signal output from the detector 202, which is an intermediate frequency, is then supplied jointly to the video intermediate frequency amplifier 250 and the audio intermediate frequency amplifier 251, each of which is tuned to accept the desired intermediate frequencies.

For purposes of description, the video channel will first be described and in this connection it will be seen that output energy from the video frequency amplifier 250 is fed through separate conductors 253, 254 and 255, it being understood that the outputs for these conductors are not necessarily taken from the same point in the amplifier 250. These conductors, 253, 254 and 255, in turn, carry signals representing respectively the video frequency modulation, the line synchronizing signals and the frame or field synchronizing signals, all as described in the Carlson patent.

In order that the receiver system shall be capable of receiving two distinctly different types of television transmission, there is provided a switching instrumentality 252 with the simultaneously and ganged action switch arms 256, 257 and 258. The switch arms in their upper positions are arranged to contact terminal points 259, 260 and 261 respectively while in their lower positions, switch arms are arranged to contact terminal points 262, 263 and 264. The upper position of the switch arms is intended to provide for receiving signals transmitted and distributed in accordance with the sequential or interlaced line methods of transmission. For this operating condition the video signals supplied to the terminal point 259 by way of the switch arm 256 and the conductor 253 are fed to the video second detector 265 whose output is fed to a video amplifier 269 whose output is direct connected by way of the conductor 270 to the control electrode 226 of the cathode ray image producing tube.

The cathode ray tube 231, as already described, includes a control electrode 226 arranged to modulate according to the control of applied signals the intensity of a cathode ray beam 232 which is developed by applying to the accelerating anode 229 a suitable positive potential relative to an electron emitting electrode, such as the conventionally shown cathode 230. The electron beam 232 which is thus developed is arranged to be projected longitudinally of the tube to impinge upon a target 233 which is either composed of a composition of luminescent material of types already known or which may be a target element of the so-called thermal type, which is also known in the art.

In order to provide suitable focussing of the electron beam 232 upon the target element 233 (frequently termed a screen) there is also usually provided with the tube 231 a second anode 295 which may be in the form of a conducting coating on the inner surface of the tube envelope. The second anode 295 is usually maintained at a potential positive relative to the accelerating anode 229 which is within the range of between 3 and 5 times the positive potential of the first anode 229 relative to the cathode.

In order that the electron beam 232 may be deflected in bi-directional paths across the target element 233, there are provided suitable deflecting coils 234 and 235 which provide vertical and horizontal motion of the beam across the target 233. In the schematic showing of Fig. 12 these coils are shown as positioned on only one side of the tube but it is understood, of course, that in practice these coils are usually positioned in the form of a yoke so as to surround the neck of the tube in well known manner.

With the arms of the switch 252 all in the upper position, as shown, the horizontal synchronizing signals are supplied by way of the conductor 254, the switch arm 257, and the terminal point 260, to the horizontal deflection control system 266 which is indicated as being "low frequency." The reason for the low frequency is that, as was above assumed, the rate at which each picture field is scanned according to the interlaced field system is twice the rate at which scanning would take place for the so-called sequential line or interlaced line methods and, therefore, the term "low frequency" is used purely in a relative sense. The horizontal deflection control system 266, as is well known, comprises the usual saw-tooth wave generators and the control systems therefor, as well as suitable wave shaping networks, which provide for forcing a current wave through the deflecting coils which shall provide a substantially uniform velocity of beam deflection in the desired directions. Details of the horizontal deflection control system, as well as its vertical counterpart, have been omitted from this disclosure for reasons of simplification and because such systems are well known in the prior art and have also been described by many authors and well known publications, such as in the Proceedings of the Institute of Radio Engineers, for example, and also, for example, by Tolson in Reissue Patent #20,338 of April 20, 1937. Accordingly, the output energy from the horizontal deflection control system 266 is fed by way of the conductor 272 to energize the deflecting coil 235, which for purposes of simplification has been shown with one terminal grounded, since the entire system has been illustrated merely by way of one wire connecting the various elements.

Similarly, the vertical synchronizing signals used for either field or frame synchronization are applied from the video frequency amplifier 250, after being separated, like the horizontal synchronizing signals, from the video signals, so as to be passed by way of the conductor 255, the switch arm 258 and the terminal point 261 to the vertical deflection control system 267 which is related in the above described manner to receiver systems capable of receiving the so-called sequential line or interlaced line video transmissions. The output currents from the vertical deflection control system 267 which are to deflect the developed cathode ray beam 232 along vertical paths, are fed by way of the conductor 274 to energize the deflecting coil 234 in a manner similar to that described in the horizontal deflection energy. For conventional reasons the coil 234 is also shown with one terminal grounded, although in practice the coil arrangement usually would be similar to that suggested for the horizontal deflecting coils.

If now, however, it is desired to provide for receiving video signals transmitted according to the interlaced field method herein more specifically described, all of the switch arms 252 are moved by reason of their uni-control so that each of the switch arms 256, 257 and 258 come to rest upon the lower terminal or contact points 262, 263 and 264 respectively and provide open circuits for the upper terminal points. In this position of the switch arms, it will be seen that the video signals supplied from the intermediate frequency amplifier 250 are fed by way of the conductor 253 so as to be now supplied to the terminal point 262 to the picture interlacing system 278. This element, while conventionally represented in Fig. 12, will be seen, comprises those various elements of Fig. 3, already described which are included within the dotted enclosing outline of a portion of Fig. 3.

Since it is possible with the arrangement of Fig. 3 to combine the detector units 221 and 227 into a single instrumentality, the output from the picture interlacing system 278 is fed by way of the conductor 283 also to energize the video second detector 265. In this way it will be seen that with the switch arm 256 resting against the lower terminal point, there is an additional combination of elements intervening between the video intermediate frequency amplifier 250 and the video second detector 265. These additional elements 278 provide for selecting the signals and allocating the signals received from the interlaced picture transmitter to the desired portion of the frequency spectrum for utilization and electro-optical image production on the tube 231.

It will also be appreciated with the picture interlacing form of image reception, it is desirable, according to the foregoing description, that the number of picture lines reproduced per picture field shall be doubled that provided for with interlaced line transmission methods and that the frequency of line repetition per second shall also be doubled that used with sequential line methods of transmission. Accordingly, synchronizing signals for controlling deflection of the cathode ray beam 232 in different lines or in a horizontal direction are fed by way of the switch arm 257 and the terminal point 263 to a horizontal deflection control system 280 which has its parameters so chosen as to develop output energy of proper frequency and wave form to deflect the beam 232 horizontally at the desired rate. The instrumentality for providing horizontal deflection control 280 is also generally similar to that provided by the element 266 and, therefore, is not described in further detail.

Output energy from the horizontal deflection control system 280 is fed by way of the conductor 290 to energize the deflecting coil 235 but it will be seen from the schematic illustration that this energy is supplied at a point 293 intermediate the coil terminals so that the effective inductance of the deflecting coil 235 serving to develop an electromagnetic field to deflect the beam 232 is only that portion of the coil 235 intermediate the conductor 293 and the terminal shown schematically as connected to ground. In this connection it will be understood that by virtue of the switch arm 257 having moved away from the upper contact point 260, that the upper end of the coil 235 is effectively open circuited so that the operating parameters of the system are not changed but by reason of the higher line deflection rate used for picture interlacing as contrasted with line interlacing methods of reception the inductance of the coil necessarily is changed and, accordingly, the foregoing is to be considered as a schematical illustration.

Similarly, for the vertical deflection of the beam 232, the vertical field or frame synchronizing signals are supplied from the intermediate frequency amplifier 250 by way of the conductor 255, the switch arm 258 and the lower terminal point 264 so as to energize the vertical deflection control system 282. The output of element 282 is then fed by way of the conductor 292 so as to energize that portion of the coil 234 intermediate the contact point 294 and its assumed ground connection. Since the vertical deflection frequency is usually the same for either method of reception the contact point 294 is usually at the end of the coil most remote from the ground connection. The reason for this has already been explained in connection with the horizontal deflection.

It was also explained particularly in connection with Figs. 2 and 3 that it is desirable to interlock the picture interlacing system 278 with the vertical deflection control system. Accordingly, a portion of the output of the vertical deflection control system 282 (or 267) is fed by way of the conductor 285 to the interlock picture frequency source 286. The output energy from the interlock element 286 is then fed by way of the conductor 287 to control the picture interlacing system 278 and thus provides a definite interlock between the beam deflection and the rate or sequency at which the received signals are allocated to different portions of the frequency spectrum.

In such systems it is usually desirable to provide some means for establishing both an automatic volume and an automatic frequency control of the received signal energy. Accordingly, a portion of the output energy from the first detector 202 is fed to a video automatic volume and automatic frequency control unit 296 which, in turn, controls the video frequency amplifier 250 in well known manner.

As was explained in the aforesaid Carlson Reissue Patent #20,700 signals representing both the video and the accompanying audio portions are received in the radio frequency selector 203 and detected in the detector 202 by which means the audio signals are allocated to a different intermediate frequency range from the video signals. The audio signals then are supplied to the audio intermediate frequency amplifier 251 in well known manner. The amplified audio signals are then detected in the audio second detector 297 and further amplified, if necessary, in an amplifier 298 and used to energize a sound reproducer 299. The audio frequency signals are also subject to control by means of suitable automatic volume control and automatic frequency control units in a manner which has been schematically represented by the control unit 300.

From the foregoing it is apparent that with the receiver instrumentality shown by Fig. 12, electro-optical images may be caused to appear upon the luminescent target 233 of the tube 231 when transmitted in accordance with a plurality of transmission methods merely by moving the switch unit 252 to either of two selected positions so that the switch arms 256, 257 and 258 simultaneously acting are caused to feed signals from the video intermediate frequency amplifier 250 to either of two selected signal responsive paths. Further, it will be appreciated from a consideration of the showing of Fig. 12 that for either of these systems there are certain elements of substantially like character which are effective in both systems. While entirely separate horizontal and vertical deflection control systems have been illustrated herein for each channel for reasons of simplification, it is also possible to use the same elements at different frequencies merely by providing that the switch arms shall be effective to change the operating parameters of these systems in a manner suitable to provide for different developed output frequencies.

Since under usual operating conditions, the vertical deflection frequency will be the same for either the interlaced line or the interlaced field methods of transmitting and receiving pictures, it is readily apparent that the vertical deflection control systems 267 and 282 may be one and the same unit in which event the terminal points 261 and 264 which are contacted by the switch arm 258 will be bridged and one or the other of the vertical deflection units 267 or 282 omitted. The interlock 286 for the picture frequency source is, however, maintained and arranged to feed energy by way of the conductor 287 to the picture interlacing system 278. In the event that the vertical deflection frequencies which are passed through the deflecting coil 234 are identical for either method of receiving the picture, it is, of course, apparent that the connection point 294 will under such circumstances be at the terminal of the coil 234 most removed from the ground connection, in which event the full coil will be effective to develop an electromagnetic field for causing beam deflection. Naturally, if a single vertical deflection control system is substituted for the two elements 267 and 282, shown, it is desirable that the conductor 292 and its associated contact point 294 upon the coil 234 be removed from the system shown. The illustration has been made in the form of Fig. 12 mainly for purposes of symmetry.

Accordingly, it should be understood that in connection with the arrangement of Fig. 12, it is possible to vary the schematic showing within wide variations without departing from the general form and system herein disclosed.

In the foregoing specification it is, of course, evident that many and various types of filters have been suggested. Various filters have been referred to as high-pass filters or low-pass filters. Particularly with respect to the high-pass filters, such as those suggested for use, particularly in connection with Fig. 1, it is evident that the so-called bandpass filters may be substituted where desired. Under such conditions, the lowest frequencies in the band of frequencies accepted will be within the desired intermediate range and such filters will have a cut-off frequency at approximately the highest limit desired for faithful image reproduction which, of course, with Fig. 1 is the assumed maximum of 3.6 m. c. which is directed through the high-pass filter 53. This will then result in a condition where frequencies higher than desired will appear only at about the same signal strength or level as "noise" and, therefore, will be ineffective in the system.

From what has been stated above, it is also evident that one definite conclusion has been established with respect to all of the filters used throughout the system and this conclusion is that these filters designed in accordance with established engineering practice shall be capable of passing the desired bands of frequency with substantially no phase distortion.

In some circumstances, it is desirable, in order that phase shift shall not occur, that an interlock be maintained between the various oscillators in the system in order that no initial phase distortion shall arise. Various methods of interlocking different elements of this nature are too well known to describe in further detail.

It is also evident from what has been stated in these specifications that while filters usually are understood as involving desired combinations of inductive and capacitive elements, used in many instances in combination with resistance elements, which have been described in considerable detail by the work of O. J. Zobel of the American Telephone and Telegraph Company and described, for instance, in the "Bell System Technical Journal" of July, 1928, where one finds analyzed many forms of networks and the like which are adaptable for use with well known forms of filtering arrangements. Nevertheless, it is frequently found desirable to substitute for the filters herein defined suitably selected electronic amplifiers which are particularly adapted and suited for response within selected frequency ranges. Accordingly, the term "filter," as used throughout these specifications, must be considered in its broad and generic sense and understood as covering not only networks but amplifiers and other allied forms of equipment of which the parameters are so selected that selected and desired frequency bands are readily passed or excluded from desired utilization apparatus or circuits and phase relationships are maintained without deleterious effects.

Also, it has been established from what has been above stated that within the meaning of this disclosure the term "delineation" must be understood as relating to the process of depicting or reproducing not only the larger areas, broader shadings, and slower motions of a picture or field in motion, but it must also be understood as including also the smaller areas and the more minute details thereof, as well as the more rapid motions and sharper edges involved therein. Accordingly, it will be appreciated that the "level of delineation" within the meanings herein rises from the first set of alternatives above defined in accordance with the addition of the second set of alternatives defined. Therefore, with such additions, the desired final level of delineation is attained and is a function of the highest frequencies (or the band width thereof) instantaneously effective.

While the receiver arrangements for the modifications of Figs. 4 and 5 have not herein been illustrated it is, of course, apparent that the receiver construction is a counterpart of the transmitter construction and, in view of the general analogy between the receiver arrangement of Fig. 3 with that disclosed by Figs. 1 or 2, it is to be understood that modifications of the receiver arrangement to receive the energy when transmitted according to the modifications of Figs. 4 or 5 may readily be made in a manner which would be apparent to anyone skilled in the art. Therefore, such modified form of receiver arrangements have not herein been specifically illustrated. Of course, it is apparent that other modifications may be made and the degree of sub-division of the signal frequency bands for frequency band interlacing as shown may be increased to any desired and practical extent and still fall within the scope of the invention herein disclosed.

In view of the fact of the broad concept of the invention, it will be understood that it consists of the division of the signal frequency band into any desired number of interlaced portions and the alternate transmission and reception of each of the groups of selected signal frequencies.

As a general proposition, it will be seen, from what has herein been disclosed, that in the transmitting process such compression or, in other words, the closing-up or downward shifting of the side-band, as is required, is carried out by the means conventionally illustrated in connection with transmitter arrangements and in the receiving process the synchronized or reversed expansion or opening-up process is carried out in general by the receiver arrangements herein conventionally described. Therefore, it is to be understood that the illustration supplied with this application is largely conventional in nature. Further than this, it also will be understood in connection with the present description as, for instance, in Fig. 3 that it may in some instances prove desirable to connect between the mixer 223 and the detector 227 a low-pass filter which is arranged to cut-off above 3.6 m. c. for removing the upper side-band produced by the heterodyning action. However, to the contrary, it is possible, in some instances, to provide the detector 227, as well as the image reproducing cathode ray tube 231 and any intervening amplifiers with such operational characteristics that the use of such filter for the purpose is unnecessary. This is true also with the arrangements of Figs. 4 and 5 where there may be inserted, where desired, suitable filters to function in the manner of that described by the low frequency filter 71 of Fig. 1. For instance, under such conditions, suitable filters might be inserted in the conductors 96 and 100 of Fig. 4, as well as in conductors 119, 127, 141, 151 and 159 of Fig. 5.

Further, in connection with this specification, for purposes of simplicity of illustration in assuming the frequency band for transmission, as was pointed out on the latter part of page 1 and first part of page 2 of these specifications, the fact that intelligence was not usually transmitted during the so-called return period usually occupying 10% of the time required for transmission, the frequency band was calculated as if the transmission of the video signals occurred for 100% of the period of each scanning cycle. In connection with this method of computation used above, it will also be appreciated that the spectrum assumed to be occupied by the signals was merely illustrative and not intended to be in accordance with actual operating conditions because it was simpler, for purpose of illustration, to ignore the fact that the video signals would be transmitted for roughly only 90% of the time. Of course, anyone skilled in the art to which this invention is directed will appreciate the fact that the frequency band will be slightly increased, under actual operating conditions, from that suggested herein but the mode of operation or the method herein described will not be changed in any fundamental manner.

From the above, it can be appreciated that the foregoing description of apparatus is subject to many and various modifications. Accordingly, it is believed that such modifications and changes may be made which fall reasonably within the inclusions and the spirit and scope of the hereinafter appended claims.

I claim:

1. A television system comprising means for repeatedly scanning a complete field of view at a predetermined cyclically recurring scanning sequence rate so as to produce for each scanning of the complete field electrical signals of selected maximum delineatory range, means for deriving from the signals resulting from the scannings of the complete field of view sequentially occurring groups of electrical signals representative of different selected delineatory ranges of depiction of the complete field within the selected maximum delineatory range, means to allocate each of the groups of signals to predominantly like frequency ranges, and means for sequentially transmitting signals controlled from the sequentially selected groups of delineatory energies.

2. A television system comprising means for repeatedly scanning a complete field of view at a predetermined rate with selected maximum delineatory range to produce electrical signals within substantially the complete spectrum between minimum and maximum frequency representing the complete field, means for deriving from cyclically repeated scanning of the complete field of view different groups of electrical signals predominantly located within adjoining frequency bands within the selected maximum delineatory range representative of different characteristics of selected delineatory ranges of the complete field, means for shifting the selected frequency bands subsequent to selection to frequency bands having predominantly similar modulation frequency ranges and means for transmitting signals controlled in the cyclic sequence by the different groups of selected delineatory energies.

3. A television system comprising means for scanning a complete field of view at a predetermined rate with selected maximum delineatory range to produce electrical signals having a frequency range between a predetermined minimum and a predetermined maximum frequency the representative of the complete field, means for deriving from sequential scannings of the complete field of view cyclically repeated groups of electrical signals having predominantly different frequency distribution within the predetermined range to represent different charactertics of selected delineatory ranges within the selected maximum delineatory range and each group representative of the complete field, means for allocating each selected group of signals to predominantly like frequency ranges, and means of transmitting the groups of developed signals in the reallocated frequency range in the cyclically repeated sequence.

4. A scanning and transmission method comprising the steps of repeatedly scanning a complete field of view with a selected maximum delineatory range at a predetermined repetition rate to produce for each scanning a series of electrical signals representative of the complete scanned field, cyclically deriving from sequential scannings predominantly different groups of electrical signals representative of the complete field of view with each group of signals in the cycle representing different selected delineatory ranges within the selected maximum delineatory range, maintaining one of the groups of electrical signals in the frequency range initially selected, allocating each other group of electrical signals in the sequence to a fraquency range predominantly corresponding to the frequency range of the group maintained in its initial frequency range, and then cyclically and sequentially transmitting signals controlled from the selected groups of delineatory energies in the reallocated frequency range.

5. A television method comprising the steps of scanning a field of view in predetermined detail at a predetermined repetition rate to develop electrical energy having frequency components within a spectral range determined in accordance with the selected detail and repetition rate, selecting one group of signals representing a portion of the energy distribution within the said spectral range and rejecting other groups of signals representing other portions of the energy distribution within the spectral range at the scanning repetition rate, then selecting the previously rejected group of signals and rejecting the previously selected group of signals, continuously altering between the selected and rejected groups of signals, transferring the plurality of selected signal groups of energy distribution subsequent to selection each to predominantly like frequency ranges, and modulating a carrier frequency for transmission by the groups of alternately selected and spectrally transformed signal energies.

6. A television system comprising means for repeatedly scanning a field of view in pre-established detail at a predetermined repetition rate to develop electrical energy having frequency components varying throughout a spectral range determined as to its maximum limit in accordance with the selected detail and repetition rate, means for selecting one group of signals representing a portion of the energy distribution within the said spectral range and rejecting other groups of signals representing other portions of the energy distribution within the spectral range at the scanning repetition rate, means for then selecting the previously rejected group of signals and for rejecting the previously selected group of signals, means for continuously altering between the selected and rejected groups of signals, means for confining the selected groups of signal energy distributions subsequent to selection to predominantly like frequency ranges, means for developing carrier frequency energy for transmitting developed signal energy, and means for modulating the developed transmitting carrier frequency energy by the groups of alternately selected and spectrally transformed signal energies.

7. A television system comprising means for scanning a field of view in preselected detail at a predetermined scanning repetition rate to develop electrical energy having frequency components throughout a frequency range determined in accordance with the selected detail and repetition rate, means for alternately separating from the complete developed frequency range that portion of the developed energy distribution within that portion of the developed frequency range between a minimum frequency and a predetermined intermediate frequency value and then selecting that portion of the developed energy distribution within that portion of the developed frequency range between substantially the predetermined and selected intermediate frequency value and the maximum frequency developed, means for alternating and changing the selection at the scanning repetition rate in sequence between the two selected ranges, means for shifting the alternately selected developed energy distributions subsequent to selection to predominantly like frequency ranges, a transmitting means, and means for alternately modulating the transmitting means by the said alternately selected and spectrally transformed energies.

8. A television system comprising means for scanning a field of view in preselected detail at a predetermined scanning repetition rate to develop electrical signal energy having energy frequency components extending throughout a spectral range determined in accordance with the selected scanning detail and repetition rate, means for selecting from the produced signal energy substantially only the signal energy group between a minimum frequency and a predetermined intermediate frequency and then subsequently selecting from the produced signal energy substantially only the signal energy group between the predetermined intermediate frequency and the maximum frequency produced, means for alternating the selection between the groups of signals at the scanning repetition rate, heterodyne means for translating one of the two selected groups of the alternately selected energy signals to a frequency range predominantly identical to the frequency range of the other selected group, means for transmitting the signal energy, and means for sequentially modulating the transmitting means by the alternately selected and spectrally shifted groups of signal energy.

9. A television system comprising means for repeatedly scanning a field of view at predetermined detail and repetition rate to produce a resultant signal output including frequencies varying between a minimum to a maximum obtainable within the selected detail and repetition rate representing maximum delineation of the entire field of view for each scanning, means for producing at the scanning repetition rate from the output signals resulting from each field scanning alternately occurring groups of signals each confined to different frequency ranges representing different levels of delineation in the scanned field, means for allocating each of the alternately occurring group of signals to predominantly identical frequency ranges, and means for alternately transmitting the group signals representing different frequency ranges allocated to like frequency ranges.

10. A television system comprising means for repeatedly scanning a complete field of view at a predetermined repetition rate to produce a resultant signal output representing for each scanning maximum selected delineation of the entire field of view, means for producing from the output signals resulting from the field scannings a plurality of cyclically recurring series of signals of which each series represents a different level of delineation of the complete scanned field of view, means for allocating each of the cyclically occurring series of signals to predominantly identical frequency ranges, and means for transmitting said frequency allocated signals.

11. A television system comprising means for repeatedly scanning a complete field of view in predetermined detail and at a predetermined repetition rate to produce a resultant series of output signals included within a frequency range extending from a predetermined minimum to a predetermined maximum representing for each scanning a maximum selected delineation of the entire field of view, means for alternately producing from the series of output signals resulting from scannings of the complete field a plurality of different groups of signals including predetermined frequencies in substantially adjacent frequency bands where each group represents a complete scanned field and a different level of delineation thereof, means for allocating each of the alternately occurring groups of signals to predominantly like frequency ranges, and means for transmitting the frequency allocated signals.

12. A method of developing television signals which comprises scanning a complete field of view repeatedly in a predetermined detail and at a predetermined repetition rate to produce a resultant video signal output representing for each scanning a selected maximum delineation of the entire field of view, producing from the video output signals resulting from alternate field scannings groups of signals representing different levels of delineation in the complete scanned field, allocating each of the alternately occurring groups of signals to predominantly identical frequency ranges, and then alternately and cyclically transmitting the radiant energy representing the selected groups of frequency allocated video signals.

13. A method of receiving and reproducing signals wherein signal energies representing different levels of delineation of a complete scanned field of view are cyclically transmitted so that the signals representing at least one scanning of the complete field of view are retained in normal spectral location and signals representing other complete scannings of the field of view are shifted to displaced spectral locations predominantly corresponding to the spectral location of the signals transmitted in normal location, and detecting the transmitted energies, electro-optically reconstituting the received signals into optical representations, and cyclically transferring the energy-flow control of the electro-optical reconstitution by the received signal energies to normal frequency locations of the received energy within a predetermined maximum frequency spectrum during the period of receipt of the normal frequency located signals, and then shifting the energy-flow control from the frequency range of the received energy to a displaced frequency band to locate the cyclically displaced transmitted signals to effective spectral ranges in electro-optical reproduction which coincide with their original spectral positions.

14. In a television system wherein groups of signals each representing different levels of delineation of a scanned complete field of view are alternately and sequentially transmitted within predominantly like frequency ranges, a receiving means comprising selector and detector means for receiving the transmitted energies, an electro-optical image reconstituting means, a plurality of signal channels linking the selector means and said image reconstituting means, and means including at least one of the said signal channels for transferring displaced groups of the received signal energies to an effective location within the predetermined maximum frequency spectrum coinciding with the original spectral positions in the said band.

15. In a television system wherein groups of signal energies each representing one of a plurality of different levels of delineation of a scanned complete field of view are sequentially transmitted within predominantly like frequency ranges, a receiving means comprising selector and detector means for receiving the transmitted groups of energies, an electro-optical image reconstituting means, a plurality of signal channels linking the selector means and said image reconstituting means to energize said last named means by the said groups of signals, means including one of the signal channels for transferring one group of the signal energy to the electro-optical means in substantially the exact frequency range of reception, and means including another of the said signal channels for transferring the received signal energies from the received frequency range to a different location within a predetermined maximum frequency spectrum to correspond to the position therein as developed so that when said groups of signals are reproduced visual persistence provides for subjectively combining the groups to represent the complete field at all selected levels of delineation in the scanning processes.

16. In a television system wherein groups of energies individually representing different frequency ranges corresponding to levels of delineation of a scanned field of view are cyclically and sequentially transmitted after having been allocated to predominantly like frequency ranges, a receiving means comprising selector and detector means for receiving the transmitted energies, an electro-optical image reconstituting means, a first signal channel linking the selector means and said image reconstituting means for transferring one group of the signals from the selector to the electro-optical means, a second signal channel linking the selector means and the electro-optical means for transferring another group of the received signal energies to the electro-optical means, and means included in the second channel for allocating the therein selected group of the received signals to a frequency range which is predominantly adjoining the signals accepted by the first signal channel so that when said groups of signals are reproduced visual persistence provides for subjectively combining the groups to represent the complete field at all selected levels of delineation in the scanning processes.

17. In a television receiver system, selector and detector means for receiving transmitted video signals and accompanying sound signals accompanied by synchronizing signals, means for transforming the several signals into intermediate frequency ranges, means for amplifying the signals at intermediate frequency ranges, means for separating the several signals one from the other, an electro-optical image producing means, a plurality of signal channels linking the amplifying means and the electro-optical image producing means, one of said signal channels comprising means for transferring the signals received to the electro-optical means in substantially the frequency range of reception, the other of said signal channels comprising means for alternately transferring the signals to the electro-optical means in the frequency range of reception and then in a frequency range shifted from that of reception to a frequency band of predominantly like range adjacent the received band, and means for selecting between the plurality of link channels so that when said groups of signals are reproduced visual persistence provides for subjectively combining the groups to represent the complete field at all selected levels of delineation in the scanning processes.

ALFRED N. GOLDSMITH.